United States Patent
Chang

(10) Patent No.: US 9,046,214 B2
(45) Date of Patent: Jun. 2, 2015

(54) LIFT SUPPORT DEVICE

(71) Applicant: JARLLYTEC CO., LTD., New Taipei (TW)

(72) Inventor: Kuo-Feng Chang, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 115 days.

(21) Appl. No.: 13/766,835

(22) Filed: Feb. 14, 2013

(65) Prior Publication Data

US 2014/0070065 A1    Mar. 13, 2014

(30) Foreign Application Priority Data

Sep. 7, 2012 (TW) .............................. 101217256 U

(51) Int. Cl.
*F16M 11/00* (2006.01)
*F16M 13/02* (2006.01)
*F16M 11/04* (2006.01)

(52) U.S. Cl.
CPC ........... *F16M 13/022* (2013.01); *F16M 11/046* (2013.01); *F16M 2200/047* (2013.01)

(58) Field of Classification Search
CPC .......... F16M 11/046; F16M 2200/047; F16M 2200/025; F16M 220/027
USPC .............. 248/286.1, 157, 161, 414, 404–405, 248/669, 125.1–125.2, 132, 917–920, 248/297.11, 337, 297.21, 222.14, 295.11, 248/225.11
See application file for complete search history.

(56) References Cited

U.S. PATENT DOCUMENTS

| 4,516,751 A * | 5/1985 | Westbrook ................. 248/279.1 |
| 4,606,557 A * | 8/1986 | Coffey ............................. 285/18 |
| 5,007,608 A * | 4/1991 | Carroll, Jr. ................ 248/297.21 |
| 7,780,125 B2 * | 8/2010 | Yen et al. .................... 248/125.1 |
| 8,047,479 B2 * | 11/2011 | Liu ................................ 248/157 |
| 2004/0011932 A1 * | 1/2004 | Duff ............................... 248/157 |
| 2010/0252695 A1 * | 10/2010 | Liu ............................ 248/125.1 |

* cited by examiner

*Primary Examiner* — Christopher Garft
(74) *Attorney, Agent, or Firm* — Guice Patents PLLC

(57) ABSTRACT

The present invention relates to a lift support device, which comprises a vertical frame, a support seat, an elastic mechanism and at least a friction compensating mechanism. A substrate of the vertical frame is installed with a pair of slide rails at two sides opposite to the support seat, the elastic mechanism includes at least a constant-force spring installed between the vertical frame and the support seat; and the friction compensating mechanism includes an adjusting unit installed on the support seat, and the distal end of the adjusting unit faced towards the substrate is connected with an elastic member and a wearing resistant sleeve; when the support seat longitudinally slides between two sides of the vertical frame, the friction between the wearing resistant sleeve and the substrate is additionally increased for compensating the insufficient elastic force or overly-large elastic force provided by the constant-force spring.

5 Claims, 7 Drawing Sheets

LIFT SUPPORT DEVICE

BACKGROUND OF THE INVENTION

1. Field of the Invention

The present invention relates to a lift support device, especially to a lift support device capable of increasing friction.

2. Description of Related Art

For meeting the requirement of changing viewing angles, a display, especially a flat display, is equipped with an elevation angle adjusting function, and some skilled people in the art have also developed a height adjusting function, so the height of the display is enabled to be adjusted for matching with viewers having various body shapes thereby complying the requirement of ergonomics.

Generally, the lift support device used in a display is installed with a support seat between a pair of slide rails, mobile rails installed at two sides of the support seat can be longitudinally moved along fixed rails of the slide rails, thereby adjusting the height of the display. Moreover, for providing a stopped and positioned effect to the display, skilled people in the art install at least a constant-force spring between the support seat and a vertical frame, so the elastic force provided by the constant-force spring can be used for balancing the weights of the display and the support seat and the friction of the pair of slide rails, however, the balancing means is the prior art therefore no further illustration is provided.

As such, when the elastic force provided by the constant-force spring is balanced with the weights of the display and the support seat and the friction of the pair of slide rails, the display can be adjusted to a proper height. With the dimension of the display getting larger and larger, the weight of the display is greatly increased, a constant-force spring having larger elastic coefficient has to be used for allowing the elastic force to be balanced with the mentioned gravity and friction.

If the elastic force provided by the mentioned constant-force spring is smaller than the weights of the display and the support seat and the friction of the pair of slide rails, the display would be lowered and abutted against the bottom of the pair of slide rails of the vertical frame, the height adjustment is unable to be processed. On the other hand, if the elastic force provided by the mentioned constant-force spring is greater than the weights of the display and the support seat and the friction of the pair of slide rails, the display would be lifted and abutted against the top of the pair of slide rails of the vertical frame, the height adjustment is also unable to be processed. As such, if a friction compensating mechanism is additionally installed between the support seat and the vertical frame, the insufficient elastic force or overly-large elastic force provided by the constant-force spring can be compensated, so the elastic force provided by the constant-force spring and the friction provided by the friction compensating mechanism can be balanced with the weights of the display and the support seat and the friction of the pair of slide rails, thereby facilitating the height adjustment of the display.

SUMMARY OF THE INVENTION

One primary objective of the present invention is to provide a lift support device, in which at least one friction compensating mechanism is installed between a support seat and a vertical frame, the friction between the support seat and the vertical frame can be additionally increased when the support seat longitudinally slides in the vertical frame for compensating the insufficient elastic force or overly-large elastic force provided by constant-force springs, thereby enabling the display and the support seat to be stably adjusted for being lifted or lowered or for being stopped and positioned between two slide rails of the vertical frame.

For achieving the aforesaid objective, one solution of the present invention is to provide a lift support device, which comprises:

a vertical frame, installed with fixed rails of a pair of slide rails respectively at an inner wall defined at two sides of a vertical substrate;

a support seat, seat pieces formed at two sides thereof are connected with mobile rails of the pair of slide rails, each of the mobile rails is slidably installed in the fixed rail, and the support seat is axially formed with at least an installation part;

an elastic mechanism, including at least a constant-force spring installed between the vertical frame and the support seat; and at least a friction compensating mechanism, including an adjusting unit installed in the each installation part, and the distal end of the adjusting unit faced towards the substrate is connected with an elastic member and a wearing resistant sleeve, thereby enabling the wearing resistant sleeve to be elastically abutted against the substrate; when the support seat longitudinally slides between two sides of the vertical frame, the friction between the wearing resistant sleeve and the substrate is additionally increased.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
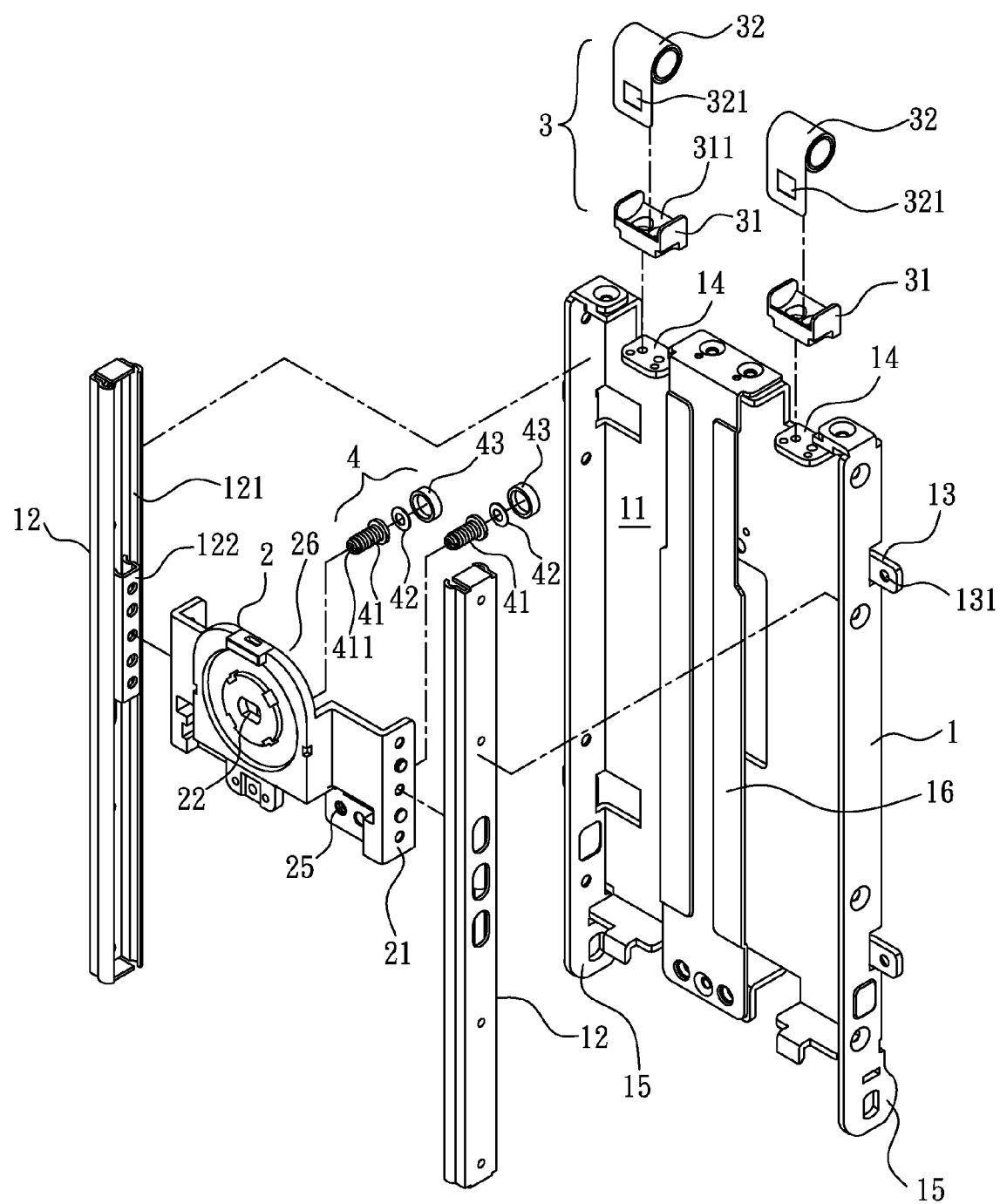
FIG. 1 is a perspective exploded view illustrating the lift support device according to a first embodiment of the present invention.
Figure 2:
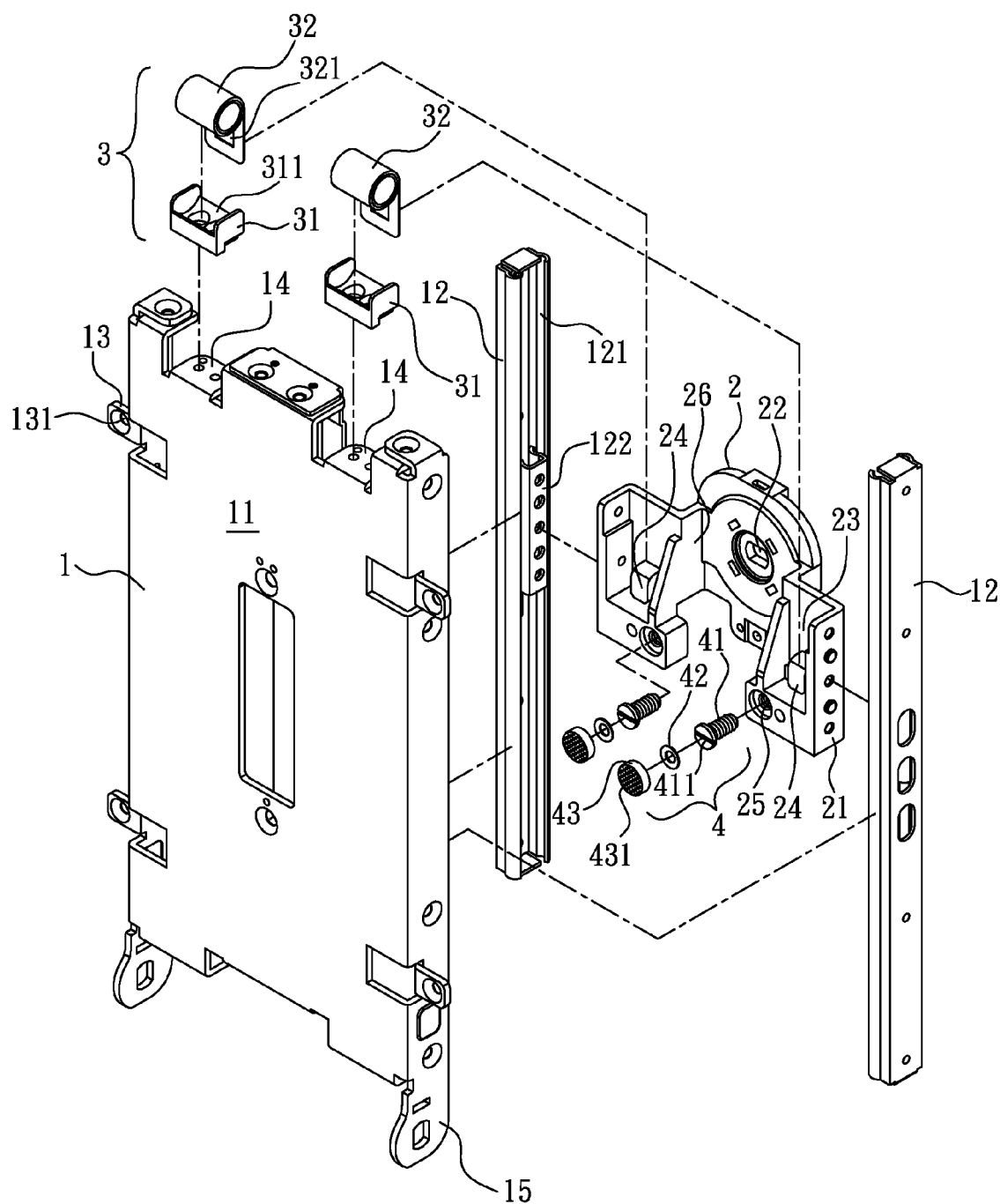
FIG. 2 is another perspective exploded view illustrating the lift support device being viewed from a different angle according to the first embodiment of the present invention.
Figure 3:
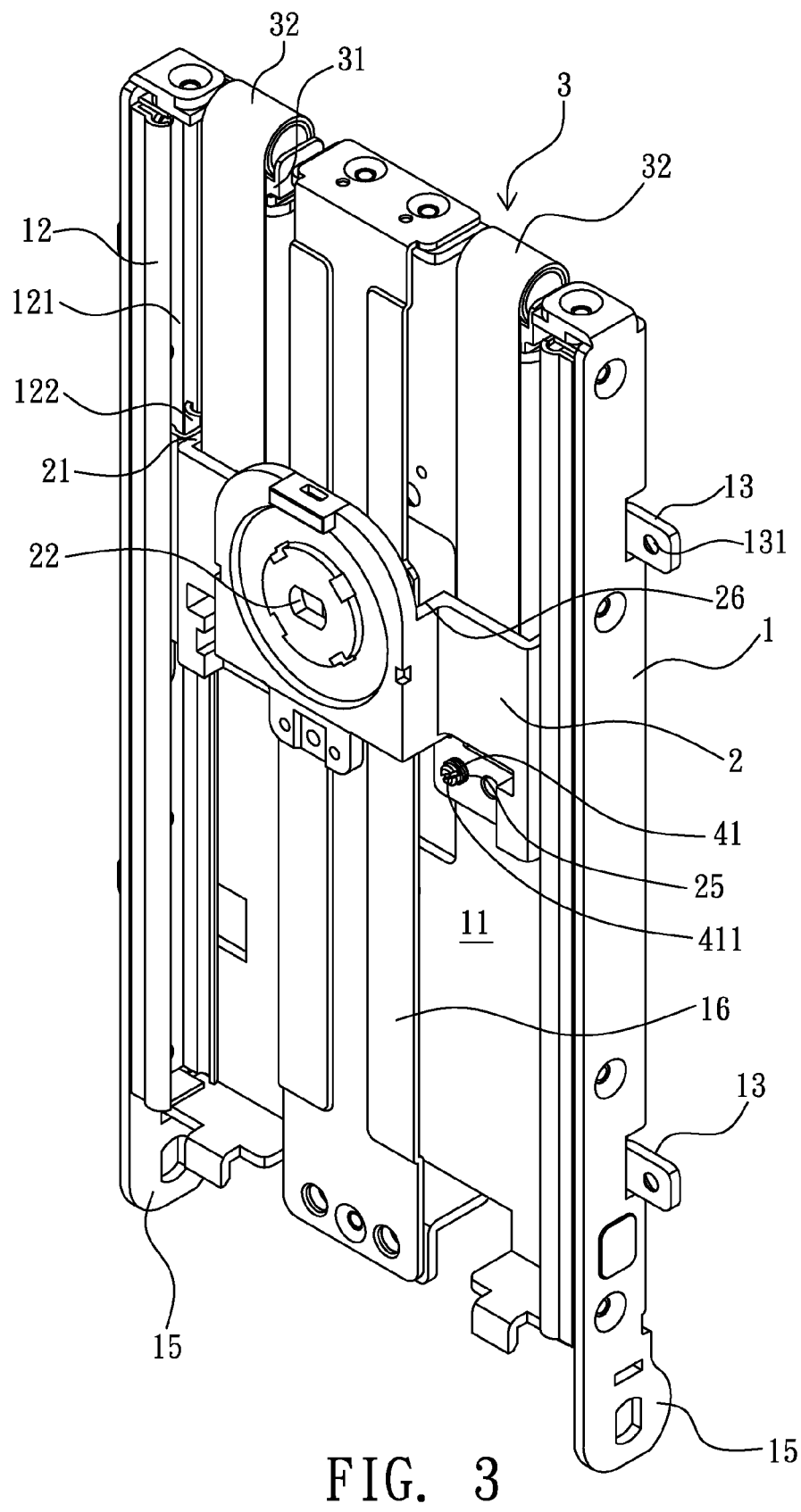
FIG. 3 is a perspective view illustrating the assembly of the lift support device according to the first embodiment of the present invention.
Figure 4:
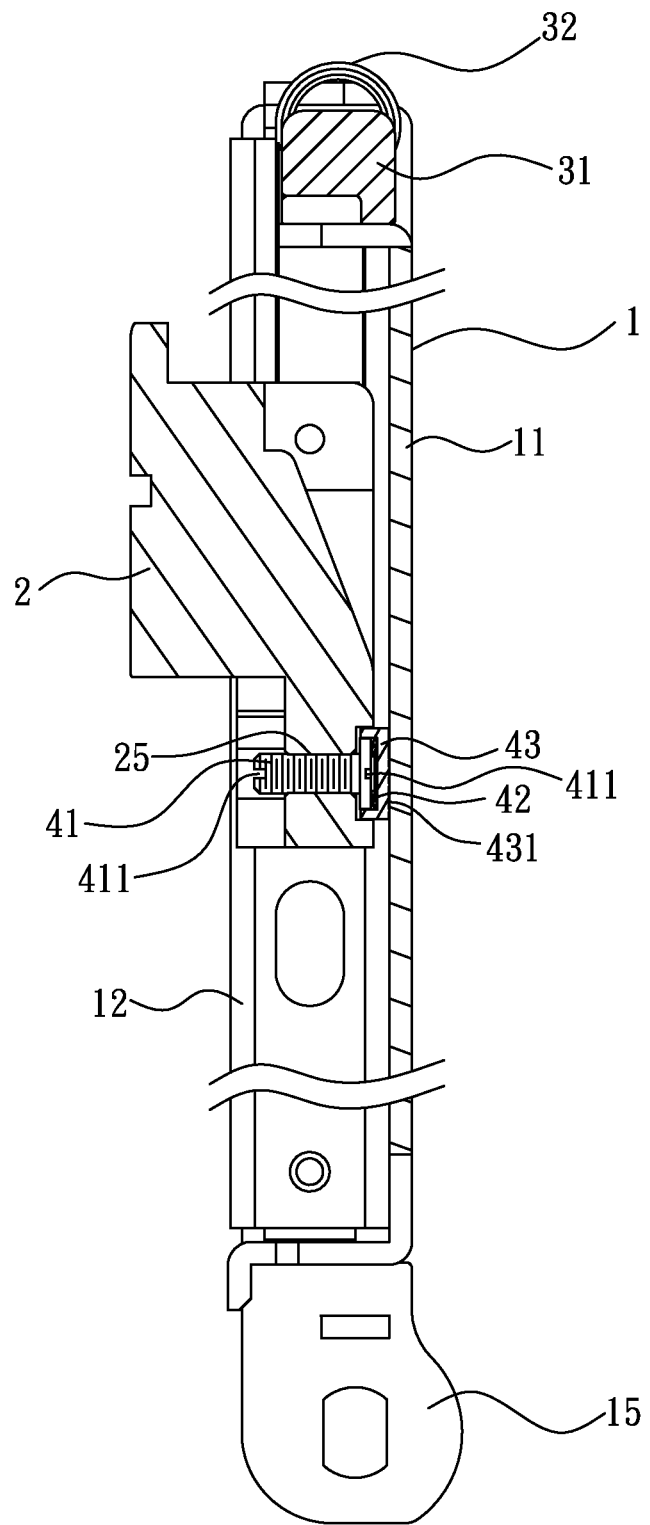
FIG. 4 is a cross sectional view illustrating the assembly of the lift support device according to the first embodiment of the present invention.
Figure 5:
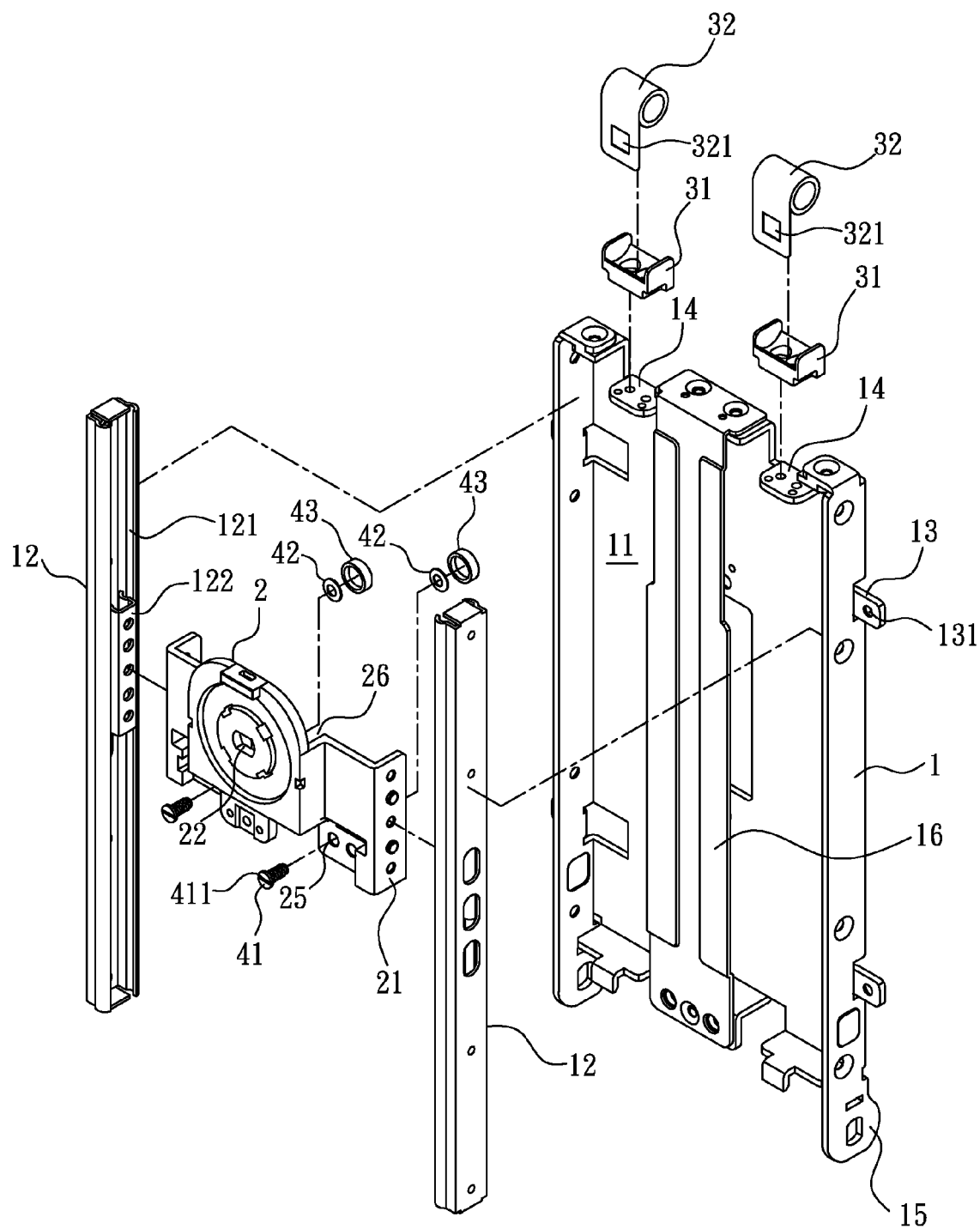
FIG. 5 is a perspective exploded view illustrating the lift support device according to a second embodiment of the present invention.
Figure 6:
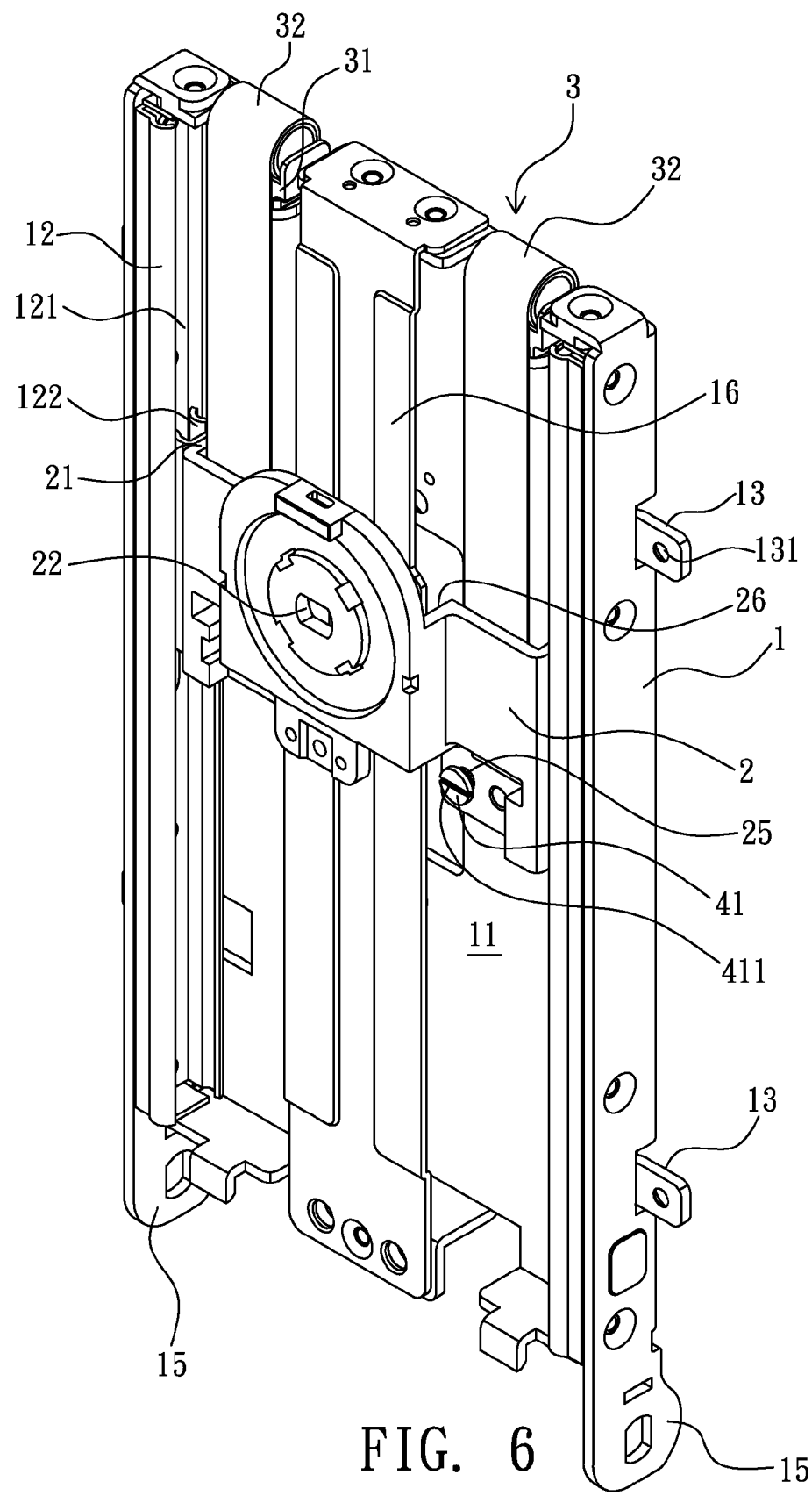
FIG. 6 is a perspective view illustrating the assembly of the lift support device shown in FIG. 5 according to the second embodiment of the present invention.
Figure 7:
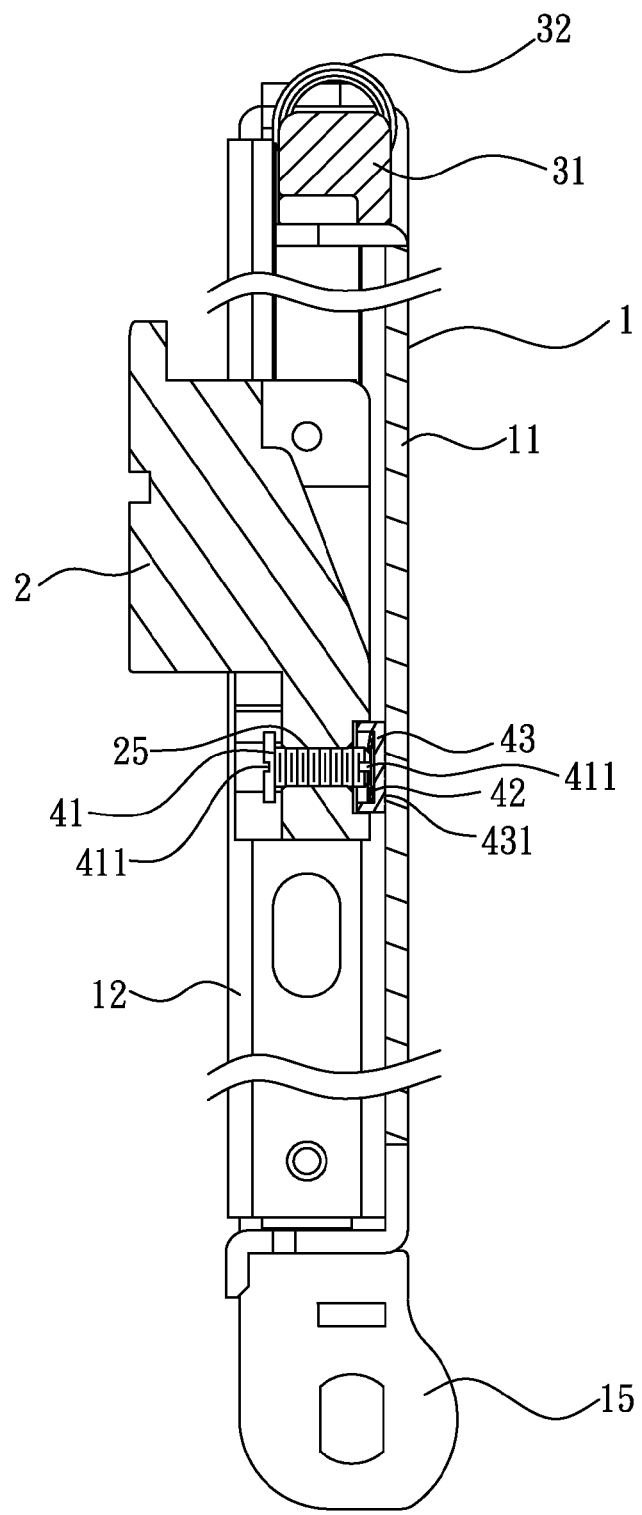
FIG. 7 is a cross sectional view illustrating the assembly of the lift support device according to the second embodiment of the present invention.

Referring from FIG. 1 to FIG. 7, wherein FIG. 1 is a perspective exploded view illustrating the lift support device according to a first embodiment of the present invention; FIG. 2 is another perspective exploded view illustrating the lift support device being viewed from a different angle according to the first embodiment of the present invention; FIG. 3 is a perspective view illustrating the assembly of the lift support device according to the first embodiment of the present invention; FIG. 4 is a cross sectional view illustrating the assembly of the lift support device according to the first embodiment of the present invention; FIG. 5 is a perspective exploded view illustrating the lift support device according to a second embodiment of the present invention; FIG. 6 is a perspective view illustrating the assembly of the lift support device shown in FIG. 5 according to the second embodiment of the present invention; and FIG. 7 is a cross sectional view illustrating the assembly of the lift support device according to the second embodiment of the present invention.

As shown from FIG. 1 to FIG. 4, according to one preferred embodiment of the present invention, the lift support device substantially comprises a vertical frame 1, a support seat 2, an elastic mechanism 3 and at least a friction compensating mechanism 4.

The vertical frame 1 is a vertical frame member, the bottom thereof is pivoted with a base (conventional components therefore not shown in figures), the vertical frame 1 is installed with a pair of slide rails 12 respectively at an inner wall defined at two sides of a vertical substrate 11, each of the slide rails 12 includes a fixed rail 121 and a mobile rail 122 capable of sliding and being installed in the fixed rail 121, and when being practiced, the slide rail 12 is e.g. but not limited to a ball slide rail. Wherein, two sides of the vertical frame 1 are protrudingly formed with plural lugs 13, each of the lugs 13 is formed with a lug hole 131, so a connection unit, e.g. a screw, can be utilized for being connected with an enclosed member, e.g. a plastic housing, provided at the outer side of the vertical frame 1 for increasing the whole artistic appearance of the vertical frame 1. In addition, the top of the substrate 11 is forwardly extended with at least a top plate 14 allowing the elastic mechanism 3 to be installed thereon. Moreover, the bottom of the vertical frame 1 is formed with a combination part 15 for being directly pivoted with the base thereby the vertical frame 1 being provided with functions of rotating and adjusting inclined angle relative to the base.

The support seat 2 is used for being connected with an object to be supported, e.g. a display (conventional components therefore not shown in figures). Seat pieces 21 formed at two sides of the support seat 2 are connected with the mobile rails 122 of the pair of slide rails 12, thereby enabling the support seat 2 to longitudinally slide between the fixed rails 121 of the pair of slide rails 12 at two sides of the vertical frame 1. Wherein, the support seat 2 is axially formed with an axial hole 22 allowing a conventional pivotal shaft to be pivoted with a rotary frame (conventional components therefore not shown in figures), and the rotary frame is further connected with a display, thereby enabling the display to be installed in front of the support seat 2, the arrangement of the display is the prior art therefore no further illustration is provided. Referring to FIG. 2, the back of the support seat 2 is radially formed with at least a seat groove 23, each of the seat grooves 23 is formed with a buckle part 24, e.g. a hook, for being connected with the elastic mechanism 3.

The technical characteristic of the support seat 2 is that: at least one side of a proper location, e.g. the bottom, is formed with at least an installation part 25, e.g. a screw hole penetrated the support seat 2 (as shown in FIG. 4), an opening of the screw hole 25 is formed at the back of the support seat 2 and faced towards the substrate 11, the other opening of the screw hole 25 is formed at the front of the support seat 2 thereby allowing the friction compensating mechanism 4 to be installed, so as to increase the friction between the support seat 2 and the substrate 11 of the vertical frame 1.

Furthermore, the back of the support seat 2 is formed with a longitudinal groove 26, and the at least one installation part 25 is disposed at a lateral side of the longitudinal groove 26 (as shown in FIG. 2) thereby facilitating the friction compensating mechanism 4 to be detached, installed or adjusted in the installation part 25. The vertical frame 1 is formed with a longitudinal rail 16 crossing the front of the substrate 11 and allowing the longitudinal groove 26 to be sleeved at the location corresponding to the longitudinal groove 26, thereby enabling the support seat 2 to slide along the longitudinal rail 16.

The elastic mechanism 3 includes at least a spring seat 31 and at least a constant-force spring 32, each of the spring seats 31 is installed on the top plate 14 of the vertical frame 1, and the top of each of the spring seats 31 is formed with a concave arc surface 311 for allowing the constant-force spring 32 formed in a coiled shape to be disposed, so the inner wall of each of the constant-force springs 32 is adjacent and against on the front wall of the spring seat 31, and an engaging part 321, e.g. a buckle hole, at the free end of each of the constant-force spring 32 is buckled with the buckle part 24, e.g. a hook, at the back of the support seat 2, thereby enabling the constant-force spring 32 to provide the elastic support force to the support seat 2 and the connected display.

Each of the friction compensating mechanisms 4 includes an adjusting unit 41, e.g. an adjusting screw, for being connected and installed in the installation part 25, e.g. a screw hole, of the support seat 2, the front and the rear end of the adjusting screw 41 are optionally formed with a mount slot 411 thereby allowing a tool, e.g. a screwdriver, to be inserted in the mount slot 411 and being applied with a force to rotate the adjusting screw 41 for being positioned. Wherein, in actual practice, the front and the rear end of the adjusting unit 41 are not limited to be formed with the mount slot, other structure providing similar or the same effect can also be adopted.

As shown in FIG. 1 and FIG. 2, the adjusting unit 41 is screwed in the screw hole 25 at the back of the support seat 2, and the distal end of the adjusting unit 41 faced towards the substrate 11 is in sequence connected with an elastic member 42 having flexible margin, e.g. a disc-shaped elastic plate, spring, and an wearing resistant sleeve 43. As shown in FIG. 4, the wearing resistant sleeve 43 is a cover member covering the adjusting unit 41, such that the elastic member 42 is disposed between the distal end of the adjusting unit 41 and the wearing resistant sleeve 43 for providing the elastic adjustment effect and forcing the wearing resistant sleeve 43 to be abutted against the substrate 11.

The combination means of the distal end of the adjusting unit 41 and the elastic member 42 is not limited to the aforesaid embodiment, a sleeve means can also be adopted, for example the distal end of the adjusting unit 41 being sleeved with the elastic member 42 and the wearing resistant sleeve 43 can also provide the same elastic adjustment effect. Wherein, the wearing resistant sleeve 43 is made of a polymer material, e.g. plastic steel (polyformaldehyde, POM), and the contact surface between the wearing resistant sleeve 43 and the substrate 11 is provided with embossed patterns 431 for increasing the friction.

With the description of each component and the relative assembling relation provided by the present invention, FIG. 3 illustrates the assembly of the present invention, and FIG. 4 illustrates the contact relation between the friction compensating mechanism 4 and the substrate 11. The support seat 2 utilizes the mobile rails 122 at two sides for being enabled to longitudinally slide between the fixed rails 121 at two sides of the vertical frame 1. The engaging part 321 of each of the constant-force springs 32 is connected with the buckle part 24 of the support seat 2; as such, theoretically, an lifting action force (elastic force) constantly supplied by the constant-force springs 32 to the support seat 2 is sufficient enough to balance the weights of the display and the support seat 2 and the friction of the pair of slide rails 12, thereby enabling the display and the support seat 2 to be adjusted for being longitudinally lifted or lowered or for being stopped and positioned between the two slide rails 12 of the vertical frame 1.

If the elastic force provided by the constant-force springs 32 is greater or smaller than the weights of the display and the support seat 2 and the friction of the pair of slide rails 12, the adjusting unit 41 of the friction compensating mechanism 4 can be adjusted to enable the wearing resistant sleeve 43 to be abutted against the substrate 11, so when the support seat 2 is adjusted for being lifted or lowered in the vertical frame 1, the friction generated between the wearing resistant sleeve 43 installed on the support seat 2 and the substrate 11 can be used for compensating the insufficient elastic force or overly-large elastic force provided by the constant-force springs 32, thereby enabling the display and the support seat 2 to be adjusted for being longitudinally lifted or lowered or for being stopped and positioned between the two slide rails 12 of the vertical frame 1.

Referring to FIG. 5 to FIG. 7, which illustrates the lift support device according to a second embodiment of the present invention. In this embodiment, the vertical frame 1, the support seat 2, the elastic mechanism 3 and the friction compensating mechanism 4 described in the first embodiment are adopted, therefore no further illustration is provided. The difference between this embodiment and the first embodiment is that: as shown in FIG. 5 and FIG. 6, the adjusting unit 41 is screwed in the installation part 25, e.g. a screw hole, at the front of the support seat 2, and the distal end of the adjusting unit 41 faced towards the substrate 11 is in sequence connected with an elastic member 42 having flexible margin, e.g. a disc-shaped elastic plate, spring, and an wearing resistant sleeve 43 made of a polymer material. As such, through changing the location where the adjusting unit 41 being screwed at the front or at the back of the support seat 2, the friction generated between the wearing resistant sleeve 43 and the substrate 11 of the vertical frame 1 can be adjusted for compensating the insufficient elastic force or overly-large elastic force provided by the constant-force springs 32.

As what has been described above, the present invention has following advantages: by installing at least one friction compensating mechanism between the support seat and the vertical frame, the friction between the support seat and the vertical frame can be additionally increased when the support seat longitudinally slides in the vertical frame for compensating the insufficient elastic force or overly-large elastic force provided by the constant-force springs, thereby enabling the display and the support seat to be stably adjusted for being lifted or lowered or for being stopped and positioned between the two slide rails of the vertical frame; moreover, an elastic member having flexible margin is installed between the adjusting unit and the wearing resistant sleeve of the friction compensating mechanism, so the wearing resistant sleeve is enabled to be elastically abutted against the substrate of the vertical frame, thereby prolonging the service life of the wearing resistant sleeve.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A lift support device, comprising:
a vertical frame, installed with fixed rails of a pair of slide rails respectively at an inner wall defined at two sides of a vertical substrate;
a support seat, seat pieces formed at two sides thereof being connected with mobile rails of said pair of slide rails, each of said mobile rails being slidably installed in a corresponding fixed rail of said pair of slide rails, and said support seat being axially formed with at least an installation part;
an elastic mechanism, including at least a constant-force spring installed between said vertical frame and said support seat; and
at least a friction compensating mechanism, including an adjusting unit installed in each said installation part, and a distal end of said adjusting unit faced towards said vertical substrate being connected with an elastic member and a wearing resistant sleeve, thereby enabling said wearing resistant sleeve to be elastically abutted against said substrate; when said support seat longitudinally sliding between two sides of said vertical frame, the friction between said wearing resistant sleeve and said substrate being additionally increased
wherein the distal end of said adjusting unit is connected with said elastic member and said wearing resistant sleeve encases said elastic member and said distal end of said adjusting unit;
wherein said installation part of said support seat is installed on at least one side at a bottom of said support seat, and each of said installation part is a screw hole penetrating said support seat; said adjusting unit is an adjusting screw, two ends of said adjusting screw are formed with a mount slot and screwed in each of said screw holes at a position selected from a group consisting of a front of said support seat and a back of said support seat, said adjusting screw is adjustable to move said wear resistant sleeve to selectively engage said vertical substrate;
wherein a top of said vertical frame is further formed with at least a top plate;
wherein said elastic mechanism is further formed with at least a spring seat installed on each of said top plates, a top of said spring seat is formed with a concave arc surface for allowing said constant-force spring formed in a coiled shape to be disposed, an engaging part at a free end of each of said constant-force springs is connected with said support seat; and
wherein a back of said support seat is radially formed with at least a buckle part for being connected with said engaging part at the free end of each of said constant-force springs;
wherein a back of said support seat is formed with a longitudinal groove, said vertical frame is formed with a longitudinal rail crossing a front of said vertical substrate and located between said pair of slide rails, said longitudinal rail being inserted into said longitudinal groove and said support seat is movable along a length of said longitudinal rail and said mobile rails of said pair of slide rails.

2. The lift support device as claimed in claim 1, wherein a contact surface between said wearing resistant sleeve and said vertical substrate is provided with embossed patterns.

3. The lift support device as claimed in claim 2, wherein said wearing resistant sleeve is made of plastic steel (polyformaldehyde, POM).

4. The lift support device as claimed in claim 1, wherein said support seat is axially formed with an axial hole allowing a pivotal shaft to be installed.

5. The lift support device as claimed in claim 1, wherein two sides of said vertical frame are protrudingly formed with plural lugs, each of said lugs is formed with a lug hole; and a bottom of said vertical frame is formed with a combination part.

* * * * *